United States Patent
Vanzetti et al.

[11] 3,830,224
[45] Aug. 20, 1974

[54] MEANS FOR DETECTING CHANGES IN THE TEMPERATURE OF THE SKIN

[76] Inventors: Riccardo Vanzetti; Ashod S. Dostoomian, both of c/o Vanzetti Infrared & Computer Systems, Inc., 605 Neponset St., Canton, Mass. 02021

[22] Filed: Dec. 19, 1972

[21] Appl. No.: 316,641

[52] U.S. Cl. .............. 128/2 H, 23/230 LC, 73/356
[51] Int. Cl.... G01k 11/16, G01n 31/22, A61b 6/10
[58] Field of Search ........ 128/2 R, 2 H; 23/230 LC; 73/356, 358

[56] References Cited
UNITED STATES PATENTS

| | | | |
|---|---|---|---|
| 3,114,836 | 12/1963 | Fergason et al. | 128/2 H |
| 3,175,401 | 3/1965 | Geidmacher | 73/358 |
| 3,440,882 | 4/1969 | Jones | 73/356 |
| 3,533,399 | 10/1970 | Goldberg | 128/2 H |
| 3,594,126 | 7/1971 | Fergason et al. | 23/230 LC |
| 3,620,889 | 11/1971 | Baltzer | 128/2 H X |
| 3,633,425 | 1/1972 | Sanford | 73/356 |

OTHER PUBLICATIONS
Technology Concentrates, Chemical & Engineering News Liquid Crystal Tape.
J. T. Crissey et al., Journal of Investigative Dermatology "Skin Temperature Patterns" May 12, 1964.
Continuous Scan Thermography–A.G.A. Corp., N.J. Scope-Mobile Type 281–2W pages 182.
Glen H. Brown, Industrial Research, May 1966 Pages 53–58 Liquid Crystals.

*Primary Examiner*—Aldrich F. Medbery
*Attorney, Agent, or Firm*—Seidel, Gonda & Goldhammer

[57] ABSTRACT

Liquid crystals which have the property of changing color in response to temperature variations are contained in packages and are carried by an article of clothing. These packages sense the temperature of the skin at a control area and at an area that is related to the reproductive system. The gradient of the temperatures between these two areas is then used to determine the existence of a physiological change.

12 Claims, 15 Drawing Figures

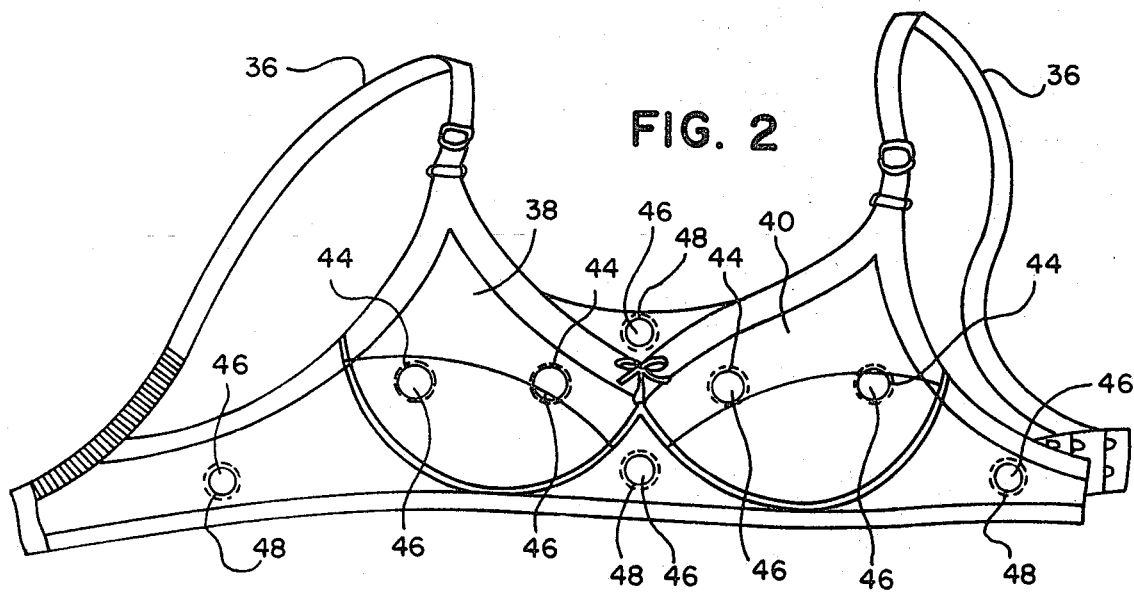
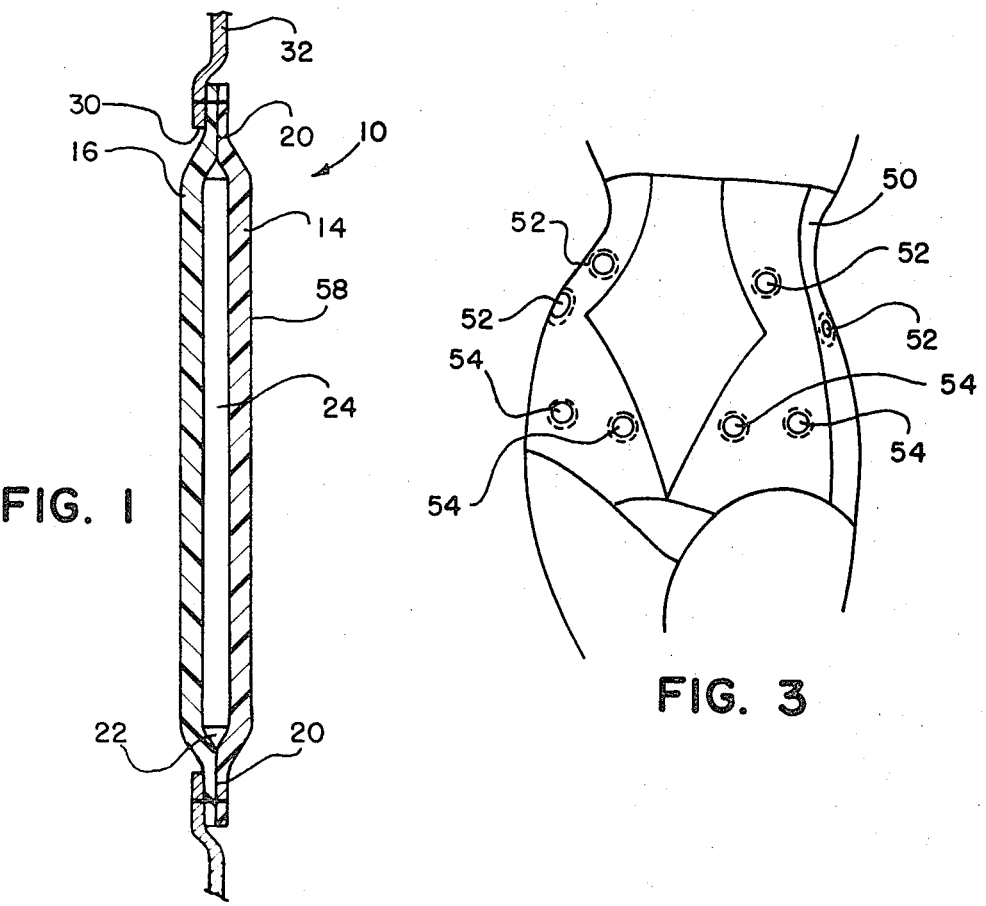

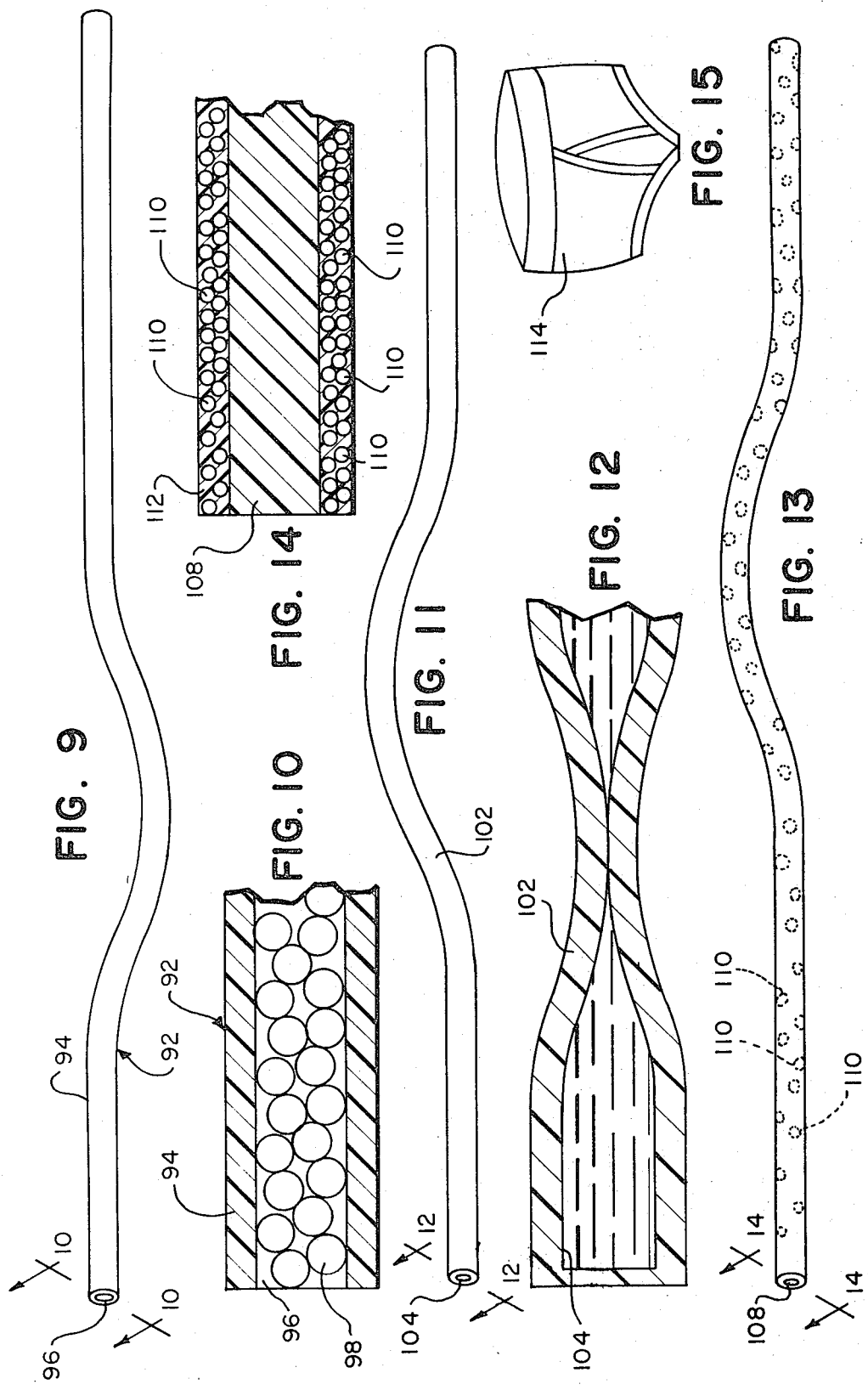

MEANS FOR DETECTING CHANGES IN THE TEMPERATURE OF THE SKIN

This invention relates to means for detecting changes in the temperature of the skin of a living body, and more particularly to means which comprise liquid crystals which can supply a visible display in color of such temperature changes, between different surface areas of the body.

It is a well known fact that many physiological changes in the body are accompanied by a change in body temperature. Sometimes the changes in temperature are general and can be sensed internally by a thermometer. Additionally, both temperature changes can be measured externally by a thermometer placed on the skin such as under the arm.

So far, temperature changes in the body have been measured by applying to the skin, in the region where it is desired to measure temperature change, suitable sensors. These sensors may comprise thermistors or other electrical sensing devices, or other physical means which are operative to indicate changes in temperature.

Recent studies of the human female body physiology have disclosed transient thermal gradients between the basal body temperature and the temperature of areas related to the reproductive system such as the breasts, the ovaries, etc. These thermal gradients are produced by hormones such as estrogen, progesterone, prolactin, etc. and they are directly related to the key events of the normal menstrual cycle.

By strategic location of temperature sensing means, transient thermal gradients can be noted. Thus, it is a known physiological fact that a woman's body goes through a noticeable drop in basal temperature at ovulation. However, ovulation is accompanied by changes in the temperature of those areas of the body that are part of the reproductive system. These changes are on the order of about a half degree to 1½° or 2°. Such temperature changes are usually increases from the basal body temperature. Suitably positioned temperature sensors can help in determining the time of ovulation.

In addition to ovulation, other physiological changes are accompanied by a temperature change in the areas affected. Thus, abnormal tissue growth and malignancies can be detected. Further, the rate of their growth can be measured by the amount of heat that is generated locally. Sensors positioned over areas where such growth is suspected will disclose their presence.

Devices have been developed heretofore for measuring body temperature. Such devices rely upon electronic sensors or other physical means which are placed on the body. Such electronic sensors are expensive to develop and difficult to use. Whenever constant monitoring is required either hand-wiring or complex telemetry equipment must be used. Other transducers responsive to temperature changes may be unstable or cumbersome and embarrassing to the person wearing them.

Accordingly, the invention relates generally to a device for detecting and visually displaying a change or a gradient in the temperature of the skin comprising an item to be worn. This item includes a multi-layer package comprising liquid crystals that are responsive to a change in the skin temperature. The liquid crystals can supply a display in visible colors, pinpointing the changes in the skin temperature of the body limited to those areas where they are applied with physical contact.

Further, the invention relates to a device for detecting and visually displaying a change in the temperature of the skin which comprises one or more multi-layer packages having liquid crystals therein. The liquid crystals are operative to change color in response to changes in the skin temperature.

Still further, the invention relates to a device for detecting and visually displaying a change or gradient in the temperature of the skin comprising an item to be worn on the body wherein liquid crystals comprise the material or the yarn which forms the item.

The invention can best be described by referring to the accompanying drawings wherein FIG. 1 is a sectional view taken through a multilayer package comprising liquid crystals;

FIG. 2 is a perspective illustration of a brassiere which carries packages of the type illustrated in FIG. 1;

FIG. 3 is a perspective view of a girdle which carries packages of the type illustrated in FIG. 1;

FIG. 9 is a perspective view of a yarn having encapsulated liquid crystals therein.

FIG. 10 is a sectional view taken along line 10—10 of FIG. 9.

FIG. 11 is a perspective view of a yarn having liquid crystals in non-encapsulated form therein.

FIG. 12 is a sectional view taken along line 12—12 of FIG. 11.

FIG. 13 is a perspective view of a yarn having encapsulated liquid crystals on its surface.

FIG. 14 is a sectional view taken along line 14—14 of FIG. 13.

FIG. 15 is an illustration of a garment constructed from one of the yarns illustrated in FIGS. 9, 11 or 13.

Figure 5:
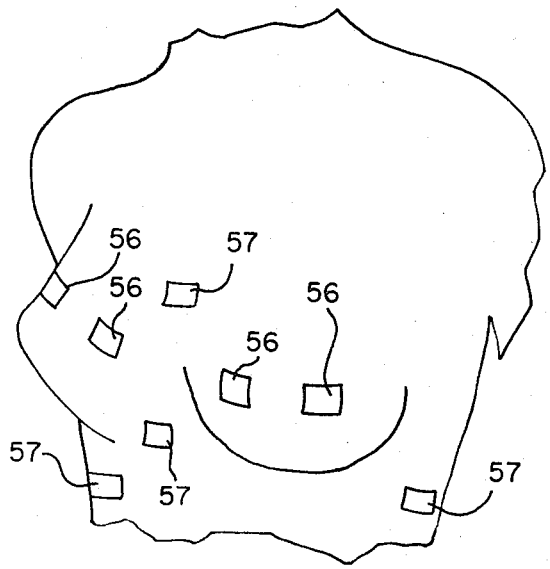
FIGS. 5 and 6 are perspective views of packages containing liquid crystals of the type illustrated in FIG. 1 mounted directly to the body.

Now referring to the drawings for a detailed description thereof, FIG. 1 shows a sectional view taken through a package 10 constructed in accordance with one presently preferred form of the invention.

The package comprises first and second sheets of plastic material 14 and 16. Sheet 14 functions as the back of the package. To this extent, it must be black, or black-coated to absorb unwanted light. On the other hand, sheet 16 is transparent to allowing viewing the colors of the liquid crystals from the front.

The two sheets of plastic material may be heat sealed along a seam 20 which extends around the periphery of the package. The sheets of material define a thin, laminar cavity 22 which carries liquid crystals which change color in response to changes in temperature. The crystals can be selected so that they are operative in a temperature range that encompasses foreseen variations of body temperature in different areas. Normally such temperatures lie between 92° and 99° F.

In a slightly different form of the invention, a sheet of paper 24 serves as a backing for the liquid crystals. The liquid crystals are supported on the backing in encapsulated form and are readily visible through the transparent sheet 16.

In the alternative, the paper backing 24 may not be used. Rather, the crystals may be deposited as a thin layer on the inside surfaces of cavity 22, which in this case is only micromillimeters wide. In any event, the liquid crystals per se and their property of displaying colors in correspondence of their temperature do not form any part of this invention. The characteristics of these materials are well documented in the art. Thus, they will not be discussed in further detail.

The package 10 may be mounted in an aperture 30 formed in a garment 32. As illustrated in FIG. 1, the package is sewn into position in the garment. However, it is apparent that other alternative devices could be used, such as staples, clips, or the like.

Still further, certain garments may be made entirely of the same plastic material as that which comprises sheets 14 and 16, and the liquid crystals layer could be applied to their entire inside surfaces in order to display the temperatures of the skin covered by the garment.

The package 10 may be mounted in many different types of garments. Two or more packages may be carried by such a garment in order to display the body temperature at various locations, and the thermal gradients between them.

Thus, FIG. 2 illustrates a brassiere having straps 36 and cups 38 and 40. Each cup is formed with two apertures 44 which are disposed on opposite sides of the central portion thereof. A package 46 containing liquid crystals of the type described is supported in each of the four apertures. Four more apertures 48 similarly equipped with other packages 46 are located at conveniently chosen control areas, such as, for instance, the sternum and the two sides of the torso. As explained above, the packages may be formed integrally with the brassiere 38 or they can be installed by suitable means after the brassiere is manufactured. Or the whole brassiere in its entirety might be a multi-layer package containing liquid crystals of one or more types.

When the brassiere is worn, the liquid crystals will monitor and continuously display the breasts' temperature and the temperature of the torso where the control surfaces are located. Thus the colors displayed by the liquid crystals will indicate whether a temperature differential exists between the breasts and the control areas.

In like manner, a girdle 50 illustrated in FIG. 3 has packages 54 containing liquid crystals of the type described supported thereon. The packages 54 are positioned on the girdle so that they overly the ovaries. Control packages 52 are located in areas where basal body temperature is prevalent. Changes in the temperature in the pelvic region are readily discerned by changes in the colors of the liquid crystals, compared with the colors displayed in the control areas.

Figure 4:
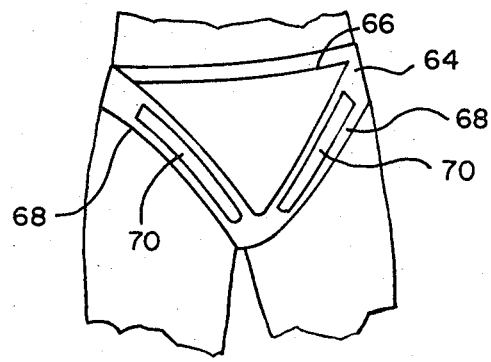
FIG. 4 is a perspective view of a belt which carries packages of the type illustrated in FIG. 1.

FIG. 4 is an illustration of another garment 64 which comprises a belt 66 having two portions 68 depending downwardly therefrom. The belt is worn so that portions 68 pass between the legs of the wearer. Elongated packages 70 containing liquid crystals of the type described herein are supported on each portion 68 in overlying relation to the ovaries and to control areas. Thus, one package will simultaneously sense temperatures at two skin areas to reveal a temperature gradient therebetween. As explained earlier, the packages may be formed integrally with the garment when it is manufactured, or they may be installed in apertures in each portion 68 after the garment is manufactured.

Figure 6:
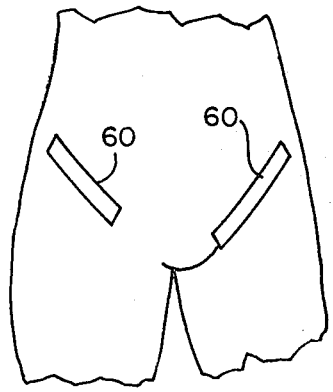

FIGS. 5 and 6 show other embodiments of the invention. Thus, FIG. 5 shows a plurality of packages 56 and 57 containing liquid crystals of the type described which are mounted directly on the body in any desired location such as the breasts and conveniently chosen control areas. To this extent, the outside surface of backing sheet 14 may have a suitable adhesive 58 thereon which permits the packages to be applied directly to the skin. If preferred the packages could be secured in place by adhesive tape. In FIG. 5, eight generally square packages 56 and 57 are illustrated. Each of the packages is positioned in substantially the same location as they would be positioned had they been formed as part of a brassiere such as illustrated in FIG. 2. Furthermore, it should be noted that the shape of the package is not critical. Thus, it may be of a convenient shape. Typical of the most useful and convenient shapes are rectangles, squares, circles and strips. This last shape is useful for taking temperature readings at a number of discrete locations.

Nevertheless, it is within the scope of this invention to provide a package of any convenient shape to monitor the temperature over any desired area of the body.

Thus, FIG. 6 illustrates two elongated rectangular packages 60 which are secured by adhesive to the body in overlying relation to the ovaries and to control areas.

Figure 7:
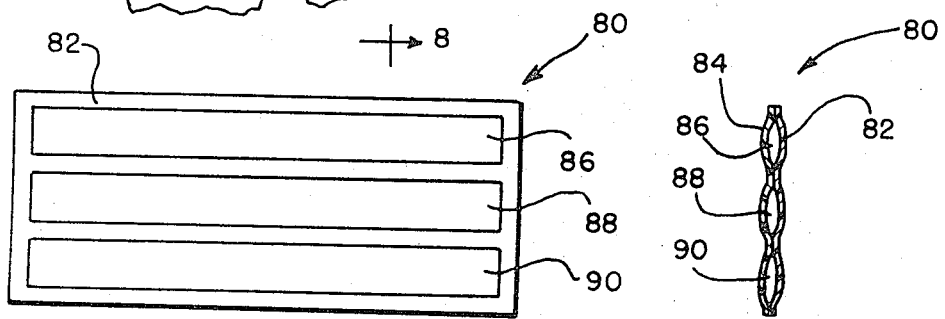
FIG. 7 is a plan view of a second embodiment of a package comprising liquid crystals.
Figure 8:
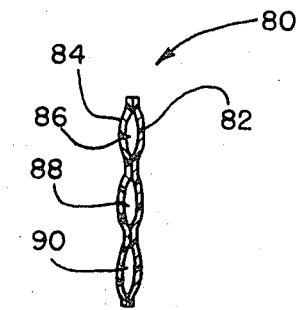
FIG. 8 is a sectional view taken along line 8—8 of FIG. 7.

A further embodiment of a package 80 of the type having liquid crystals is illustrated in FIGS. 7 and 8. The package is comprised of sheets of plastic material 82 and 84. Sheet 82, being the front sheet, is transparent. However the sheets are seamed to provide a plurality of cavities for the liquid crystals. While three cavities 86, 88 and 90 are illustrated, it is apparent that more or less could be used if desired. The liquid crystals can be in solution or they may be encapsulated and supported on a backing as described above. The liquid crystals in each cavity are selected so that they are operative in different temperature ranges. Thus the crystals in cavity 86 may be operative over a range of 93° to 95° F. The crystals in cavity 88 may be operative in the range of 95° to 97°F. while the crystals in cavity 90 may be operative in the range of 97° to 99° F.

In addition to the formation of packages such as those described above, entire garments can be formed from yarns which comprise the liquid crystals of the type described herein.

Thus, it is well known in the prior art that transparent hollow yarns can be formed from synthetic material.

A typical yarn formed thereby is identified by numeral 92 in FIG. 9. Thus, the yarn is an elongated slender flexible member having a transparent side wall 94 and an elongated opening 96 therein.

The liquid crystals may be confined in capsules 98. The capsules in turn may be received within the opening 96.

It is preferred that the capsules have a diameter of between about 10 and 50 microns. However, smaller or larger capsules may be used in accordance with the particular characteristics of the hollow yarn and the nature of the item which is to be made therefrom. The techniques for encapsulating liquid crystals are well known and have been extensively documented in the prior art. As they form no part of this invention, they will not be discussed any further.

Referring now to FIG. 11, a yarn 102 which is identical to yarn 92 (FIG. 9) is illustrated. However, in the opening 104 in this yarn, the liquid crystals are not encapsulated. Thus, the opening 104 in this yarn 102 is closed at intervals as by being pinched and heat sealed or the like to trap the liquid crystals therein.

Referring to FIG. 13, another form of yarn is illustrated. The yarn 108 has a plurality of encapsulating members 110 supported on its surface by a layer of plastic 112. Each of the encapsulating members has contained therein liquid crystals of the type described herein.

It is apparent that each of the types of the yarns described herein can advantageously be used to create garments of any desired size, shape or construction. It may be desirable in some instances for the entire garment to be made from the yarn. On the other hand, for special purposes it may be desirable only to form a portion of the garment from the types of yarn described herein. Additionally, it may be desirable to make a patch or swatch from the yarn so that it can be attached to a portion of the body such as the leg, arm, chest, back or the like. In view of the foregoing, there is illustrated in FIG. 15, an under garment which is typically of the type of item which can be formed from the yarns described above.

While the invention has been described with reference to certain specific embodiments thereof, it is apparent that many other forms and embodiments will be obvious to those skilled in the art in view of the foregoing description. Thus, the scope of the invention should not be limited by the description of the embodiments disclosed herein, but, rather by the scope of the claims appended hereto.

We claim:

1. A device for detecting and visually displaying a thermal gradient between at least two skin areas of a living body comprising an item to be worn on said body, said item supporting at least two packages containing liquid crystals that are responsive to changes in skin temperature, said item being adapted to support one of said packages over a control area where basal body temperature is sensed and being further adapted to support the other of said packages over an area that is related to the reproductive system to sense body temperature changes thereat.

2. A device as defined in claim 1 wherein said item is a girdle, and said other package is supported by said girdle to lie over the ovaries.

3. A device as defined in claim 1 wherein said item is a brassiere, said brassiere having at least one cup, and said other package comprises a part of said cup.

4. A device as defined in claim 3 wherein another part of said cup comprises an additional package containing liquid crystals that are responsive to changes in skin temperatures, and said other package and said additional package are disposed in spaced relation thereon.

5. A device as defined in claim 1 wherein said item is an article of clothing, said article having at least two apertures formed therein, one of said packages being positioned in each of said apertures, and means for securing said packages to said article of clothing.

6. A device for detecting and visually displaying a thermal gradient between at least two skin areas of a living body comprising an item to be worn on said body, said item comprising a package containing liquid crystals that are responsive to changes in skin temperature, said package being large enough to have a first part that lies over a control area where basal body temperature is sensed and a second part that lies over an area that is related to the reproductive system to sense body temperature changes thereat.

7. A device as defined in claim 6 wherein said item includes a belt having at least one downwardly depending portion, said first part of said package being supported by said downwardly depending portion to lie over an ovary and said second part being supported by said downwardly supporting portion to lie over a control area.

8. A device as defined in claim 7 wherein said belt includes a second downwardly depending portion, a second package containing liquid crystals that are responsive to changes in skin temperature being supported by said second depending portion, a first part of said second package being supported to lie over the other ovary and a second part of said second package being supported to lie over a control area.

9. A device as defined in claim 1 wherein each of said packages is comprised of first and second sheets of plastic material having a layer of said liquid crystals therebetween, at least one of said sheets being transparent, said layer of liquid crystals being adapted to change color in response to changes in skin temperature.

10. A device as defined in claim 9 wherein said sheets and layer are rectangular.

11. A device as defined in claim 9 wherein said sheets and layer are circular.

12. A device as defined in claim 9 wherein said sheets define a plurality of cavities, said layer of liquid crystals being disposed in each of said cavities, and the liquid crystals in each of said cavities are operative in a different temperature range.

* * * * *